United States Patent Office 3,493,397
Patented Feb. 3, 1970

3,493,397
IRRADIATION STABILIZATION OF PARTIALLY
DEHYDRATED MEAT
Gary W. Shults, Milford, Mass., assignor to the United States of America as represented by the Secretary of the Army
No Drawing. Filed June 28, 1967, Ser. No. 650,165
Int. Cl. A23b 1/00
U.S. Cl. 99—157          5 Claims

ABSTRACT OF THE DISCLOSURE

A process whereby fresh and prepared meat items are partially dehydrated, sealed within containers, subjected to a sterilizing dose of ionizing radiation, and in the case of fresh meat items are subsequently blanched within the container.

---

This invention relates to a process for stabilizing fresh and prepared meat items and more particularly to a process which will eliminate the undesirable organoleptic changes which generally occur in such items when sterilized by exposure to high energy ionizing radiation.

Sterilization of food items with high energy ionizing radiation characteristically brings about changes in the properties of the item so treated. The objectionable organoleptic changes in sterilized food items which have been observed heretofore include, for example, color changes, off odors, changes in texture and the development of irradiation flavors. If food items sterilized by ionizing radiation are to be accepted, it is essential that the resulting product be nearly similar in color, taste, odor and texture to the fresh or the cooked meat items. While considerable research activity has been directed toward overcoming or eliminating these undesired organoleptic changes in irradiated food items, all of the proposed solutions have either increased the cost of processing or have required the addition of chemical additives which are undesirable in food products. One technique which has been employed with some success is that of irradiating food items while they are maintained at low temperatures, below 0° C. This technique has improved the quality of the irradiated product, but additional improvements in the product are desired. Chemical scavengers have been used to eliminate some of the undesired flavor changes and odors but it is unlikely that any of these chemical agents would be suitable as an additive in a food product and generally are not successful in preventing unwanted color changes and texture changes.

It has been found in accordance with the present invention that partial dehydration of fresh and prepared meat items prior to sterilization with high energy ionizing radiation results in a marked improvement in the quality of the sterilized item. Fresh and prepared meat items are dehydrated to a total moisture content that is at least 10% below the items' normal moisture content but is not less than a total moisture content of 35% by weight. The dehydrated items are then packaged in gas tight containers under vacuum, exposed to a sterilizing dose of ionizing radiation and blanched within the container. Products prepared in accordance with this invention compare quite favorably with non-irradiated items and are preferred over non-dehydrated irradiated fresh and prepared meat items. Blanching within the container following sterilization is advantageous in that it is possible to use slightly lower temperatures to inactivate the enzymes not already inactivated by the irradiation treatment. Heretofore post-irradiation blanching has not been practical because the blanching step would cause an excessive amount of juice to be cooked out of the meat, which juice contains soluble flavor and nutrient components of the food item.

High energy ionizing radiation useful in the sterilization of food stuffs has energy levels that range from 750,000 electron volts to about 10,000,000 electron volts. The types of ionizing radiation which may be used are well known in the art, and preferably include, for example, electron beams, gamma rays and X-rays. Electron beams are generated by electron accelerators such as the Van de Graaf electron generator which operates at 2,000,000 volts with a power output of 500 watts, or resonant transformer units operating at 1,000,000 or 2,000,000 volts. Gamma rays may conveniently be obtained from the decay of radioactive materials such as Cobalt 60. It is preferred that the energy level of the ionizing radiation be less than 12,000,000 electron volts in order to avoid any problem with respect to induced radioactivity in the food items treated.

Sterilization of food stuffs requires dosages of the ionizing radiation in the range of approximately 1.0 to about 10.0 megarads and preferably from about 2.0 to about 6.0 megarads. Rad is a unit of absorbed dose of ionizing radiation equal to an energy of 100 ergs per gram of irradiated material.

Irradiation of the food items described in the following example was accomplished by exposing the food items to gamma radiation emanating from a 900,000 curie Cobalt 60 source. The physical arrangement of the source consists of two spaced apart parallel plaques which contain the radioisotope. Samples are placed in stacked aluminum canisters and carried by conveyor between the plaques for a period of time necessary to reach the desired dosage level. Dosimeters are normally distributed throughout the samples being irradiated to measure the dosage being absorbed.

The products which may be treated in accordance with our invention include fresh meat items such as beef, veal, lamb, pork and poultry and prepared meat items such as frankfurters, sausage, bologna and luncheon meats.

EXAMPLE 1

Fresh, round, beef muscle, choice grade, 7 days from slaughter, having a total moisture content in the range from 72 to 75% by weight is partially dehydrated to various moisture levels to produce samples ranging from 61% moisture to 35% in moisture content. Any conventional dehydration technique may be employed to accomplish the dehydration but in the present example, the samples are dehydrated in a drying apparatus using silica gel while held under a vacuum of 5 to 10 inches of mercury. The partially dehydrated beef samples are vacuum sealed in tin clad steel cans. The dehydrated canned beef samples are then irradiated while held at a temperature of −80° C. and received a dose in the range of 4.5 to 5.6 megarads. The canned samples are then blanched by immersion in a hot water bath until the internal temperature within the sample reached 160° F. The samples are then cooled and held at room temperature. After 72 hours, the samples were removed from the cans and were evaluated by a panel of expert food testers for sensory characteristics and for an indication of food preference. Ratings for sensory characteristics were made on a scale of from one to nine with one being none or best and nine denoting the worst. Preference ratings were made on a hedonic scale of one to nine with nine being most preferred. The results of the examination are set forth below in Table 1 wherein four partially dehydrated samples were compared with a non-irradiated control which had been cooked to the same internal temperature (160° F.) and with a control that had been cooked to 160° F. prior to irradiation but had not been partially dehydrated (sample No. 6).

An additional control sample that had been exposed to the same processing conditions (irradiation followed by blanching) but had not been dehydrated was compared with the partially dehydrated samples. This control had within the container a large accumulation of juices which weighed approximately 43 grams. The partially dehydrated samples had very little free juice within their containers and in all instances the amount weighed less than 5 grams. It can be readily seen, therefore, that the step of dehydrating the beef samples prior to irradiation not only improves the quality of the irradiated products, but also prevents the formation of excessive juices within the container which juices remove water soluble flavor components and nutrients from the beef samples.

tially dehydrated to bring the moisture content of samples within a range varying from about 50% to about 44%. The pork samples were then packaged under vacuum in tin clad steel cans and the packaged samples were then exposed to irradiation to a dosage level to approximately 5.0 megarads. The samples were maintained at a temperature of 20° C., during the irradiation step. Following irradiation, the canned samples were immersed in a hot water bath and held until the samples achieved an internal temperature of about 160° F. so as to inactivate the enzymes. After the samples were stored for one week at 25° C., they were opened and examined by a panel of expert food testers. Again, as with the chicken and beef samples, it was observed that with respect to the low moisture level samples, there was a significant reduction in the

TABLE 1

| Samples | Off color | Off odor | Mushiness | Friability | Dryness | Irradiation flavor | Preference |
|---|---|---|---|---|---|---|---|
| (1) Non-irradiated control | 1.0 | 1.0 | 1.0 | 1.0 | 2.6 | 1.1 | 6.1 |
| (2) 51% moisture content | 3.1 | 2.4 | 1.9 | 2.6 | 2.9 | 2.0 | 5.5 |
| (3) 42% moisture content | 2.8 | 2.1 | 1.6 | 2.1 | 3.1 | 2.1 | 5.3 |
| (4) 50% moisture content | 2.6 | 2.0 | 2.4 | 2.4 | 2.6 | 2.4 | 5.3 |
| (5) 37% moisture content | 3.0 | 1.8 | 1.4 | 1.8 | 3.6 | 1.8 | 5.3 |
| (6) Non-dehydrated, precooked and then irradiated control | 2.5 | 2.4 | 2.9 | 2.9 | 2.6 | 2.8 | 5.1 |

EXAMPLE 2

Fresh boneless chicken breast, U.S.D.A. Grade A having a normal total moisture content of from 65 to 70% were quantity of juices in the container over that of the normal moisture sample. The results of the examination are set forth below in Table 3.

TABLE 3

| Samples | Off color | Off odor | Mushiness | Friability | Dryness | Irradiation flavor | Off flavor | Preference |
|---|---|---|---|---|---|---|---|---|
| (1) Non-processed control | 1.7 | 1.0 | 1.1 | 2.0 | 3.4 | 1.0 | 1.5 | 5.9 |
| (2) 49% moisture content | 2.6 | 1.6 | 1.9 | 2.0 | 1.6 | 1.9 | 1.6 | 6.0 |
| (3) 47% moisture content | 2.0 | 1.7 | 2.3 | 2.0 | 2.0 | 2.0 | 1.7 | 6.3 |
| (4) 43% moisture content | 2.0 | 1.7 | 2.1 | 2.0 | 2.1 | 1.9 | 1.9 | 5.4 |
| (5) Non-dehydrated, precooked and then irradiated control | 2.1 | 2.6 | 2.3 | 2.3 | 3.6 | 2.3 | 1.9 | 4.7 | partially dehydrated to a moisture content ranging from about 50% to about 60%. Samples within this moisture content range were packed under vacuum in tin clad steel cans and were brought to a temperature of −80° C. While held at −80° C., the samples were irradiated to a dosage level of 4.5 megarads. The samples were then immersed in a hot water bath until an internal temperature of 170° F. was attained. This temperature was sufficient to inactivate the enzymes present in the samples. After 72 hours, the samples were opened and examined by a taste panel and compared with controls. The results of the examination are set forth below in Table 2. It was also observed that the previously dehydrated canned samples contained less free juice than did a non-dehydrated sample otherwise subjected to the same processing steps. Again the excessive juice in the can of the non-dehydrated sample is considered to be highly undesirable since such juices serve as a vehicle to carry away water soluble flavor components as well as water soluble nutrients.

EXAMPLE 4

Commercial frankfurters consisting of pork and beef having a normal moisture content of approximately 60 to 65% were partially dehydrated to 3 different moisture levels. The formulation of these frankfurters consisted of approximately 48% by weight of beef and 49% by weight of pork, together with a total of 3% by weight of the following: non-fat milk solids, corn syrup, salt, pepper, sodium nitrate, sodium nitrite and sodium erythorbate. The samples were packaged under vacuum in flexible containers formed of a film laminate of polyester-aluminum-polyolefin. The packaged samples were irradiated to a dose of 4.5 to 5.6 megarads while held at a temperature of −80° C. The samples were then evaluated by an expert panel for sensory characteristics and were compared with a control sample and an irradiated nondehydrated control. The results are tabulated below in Table 4. The results indicate a reduction of the effects of irradiation in the previously dehydrated frankfurters. The color and texture

TABLE 2

| Samples | Off color | Off odor | Mushiness | Dryness | Irradiation flavor | Off flavor | Preference |
|---|---|---|---|---|---|---|---|
| (1) Untreated control | 1.8 | 1.2 | 1.7 | 2.5 | 1.5 | 1.8 | 6.5 |
| (2) 53% moisture content | 2.3 | 2.5 | 2.0 | 2.3 | 2.5 | 1.8 | 5.3 |
| (3) 50% moisture content | 2.5 | 2.3 | 2.3 | 3.2 | 2.3 | 1.7 | 5.8 |
| (4) 56% moisture content | 3.2 | 2.3 | 2.5 | 2.7 | 2.0 | 3.0 | 4.4 |
| (5) Non-dehydrated, precooked and then irradiated control | 2.2 | 2.5 | 2.3 | 3.8 | 2.7 | 2.5 | 4.2 |

EXAMPLE 3

Fresh, boneless loin pork chops, 7 days from slaughter having a 65 to 70% total moisure content were parcharacteristics of the previously dehydrated samples show a marked improvement over the normal moisture irradiated frankfurters. It is preferred that the frankfurters be partially dehydrated to a total moisture content ranging from about 33% to about 50%.

TABLE 4

| Samples | Discoloration | Off odor | Mushiness | Irradiation flavor | Off flavor | Preference |
|---|---|---|---|---|---|---|
| (1) 33% moisture content | 1.8 | 2.3 | 1.3 | 1.8 | 2.0 | 5.5 |
| (2) 38% moisture content | 2.2 | 2.2 | 1.7 | 2.0 | 1.8 | 5.8 |
| (3) 40% moisture content | 2.0 | 2.3 | 1.5 | 2.2 | 2.0 | 5.5 |
| (4) 62% moisture content (Non-dehydrated irradiated sample) | 3.2 | 2.5 | 2.7 | 2.7 | 2.3 | 4.7 |
| (5) Control | 1.2 | 1.3 | 1.8 | 1.3 | 1.3 | 7.2 |

It is preferred that the irradiation of the meat items occur while the products are maintained at a temperature ranging anywhere from ambient (25° C.) down to −196° C.

It can be seen, therefore, that the step of partially dehydrating fresh and prepared meats so that the moisture content is reduced by at least 10% of its normal value but not less than 35% by weight total moisture content prior to the irradiation sterilization step results in a sterilized product having improved organoleptic properties. Partial dehydration has a further advantage in that it permits the fresh meat items to be blanched in the containers after irradiation without the formation of excessive juices. Excessive meat juices in the container result in a loss of soluble flavor components and nutrients from the meat and for this reason is considered to be highly undesirable.

It will be understood that the above embodiments of the invention are illustrative only and that modifications will occur to those skilled in the art. The invention, therefore, is not to be limited to the specific examples disclosed herein, but is to be defined by the claims.

I claim:
1. An improved process for sterilizing fresh and prepared meat items with high energy ionizing radiation which comprises
    (a) partially dehydrating meat items selected from the group consisting of fresh and prepared beef, veal, lamb, pork, and poultry, which is dehydrated to a total moisture content between about 60% and 33% by weight,
    (b) packaging the partially dehydrated meat items under vacuum in gas tight metal containers,
    (c) irradiating said packaged meat items with high energy ionizing radiation to a dosage from about 1.0 to about 10.0 megarads while the meat item is maintained at a low temperature of below 0° C. to −196° C., and thereafter blanching the canned irradiated meat item by heating the same until an internal temperature of 160–170° F. is attained to inactivate the enzymes present in the meat.

2. A process according to claim 1 wherein the fresh meat is beef muscle which is dehydrated to a total moisture content of from about 60% to about 35%.

3. A process according to claim 1 wherein the fresh meat is pork muscle which is dehydrated to a total moisture content of from about 50% to about 44%.

4. A process according to claim 1 wherein the fresh meat is chicken muscle which is dehydrated to a total moisture content of from about 60% to about 50%.

5. A process according to claim 1 wherein the meat products are frankfurters partially dehydrated to a total moisture content of from about 50% to about 33%.

References Cited

UNITED STATES PATENTS

| 2,832,689 | 4/1958 | Proctor et al. | 99—157 |
| 2,963,369 | 12/1960 | Urbain | 99—217 X |
| 3,025,171 | 3/1962 | Schroeder | 99—204 X |
| 3,093,489 | 6/1963 | Alexander et al. | 99—217 |
| 3,215,538 | 11/1965 | Sada | 99—214 |
| 3,425,850 | 2/1969 | Salvage et al. | 99—208 |

FOREIGN PATENTS 605,021  9/1960  Canada.

NORMAN YUDKOFF, Primary Examiner

F. E. DRUMMOND, Assistant Examiner

U.S. Cl. X.R.

99—174, 187, 208, 217